US005763553A

United States Patent [19]
Miljkovic

[11] Patent Number: 5,763,553
[45] Date of Patent: Jun. 9, 1998

[54] PROCEDURE FOR MANUFACTURING AND APPLICATION OF NOVEL POLYCARBOXILATE TYPES

[76] Inventor: Dusan A. Miljkovic, 1112 Danielle Dr., Costa Mesa, Calif. 92626

[21] Appl. No.: 783,280

[22] Filed: Jan. 3, 1997

[51] Int. Cl.$^6$ .................................................. C08F 30/04
[52] U.S. Cl. ...................... 526/240; 526/271; 526/318.2
[58] Field of Search .............................. 526/318.2, 271, 526/240

[56] References Cited

U.S. PATENT DOCUMENTS

| | | | |
|---|---|---|---|
| 4,519,920 | 5/1985 | Fukumoto et al. | 526/318.2 |
| 4,709,091 | 11/1987 | Fukumoto et al. | 526/318.2 |
| 5,135,677 | 8/1992 | Yamaguchi et al. | 526/318.2 |
| 5,244,988 | 9/1993 | Hughes et al. | |
| 5,268,437 | 12/1993 | Holy et al. | 526/318.2 |
| 5,336,744 | 8/1994 | Swift et al. | 526/318.2 |

FOREIGN PATENT DOCUMENTS

| | | | |
|---|---|---|---|
| 0337694 | 10/1989 | European Pat. Off. | 526/318.2 |
| 60-212410 | 10/1985 | Japan | 526/318.2 |
| 2156831 | 10/1985 | United Kingdom | 526/318.2 |

*Primary Examiner*—Joseph L. Schofer
*Assistant Examiner*—N. Sarofin
*Attorney, Agent, or Firm*—Crockett & Fish; Robert D. Fish, Esq.; David J. Zoeteway

[57] ABSTRACT

The invention is related to the synthesis of novel types of maleic-acrylic copolymers containing 60 to 100% of maleate units (by weight), respectively, 40 to 0% of acrylate units (by weight) based on the sum of both monomeric units composing the copolymer. These copolymers show significant techno-economical and ecological advantages over previously synthesized and described acrylic-maleic copolymers. According to the optimal synthetic procedure for this class of copolymers, one uses very concentrated starting alkaline maleate solutions (at best over 60%), hydrogen peroxide and alkaline peroxy salts as initiators—catalysts for the copolymerization process, as well as reaction temperatures between 105° and 115° C. The obtained copolymers have average molecular masses around 20000, while CCDC values are approximately 17–18 ml 0.25M Calcium Acetate per 1 g of copolymer. The obtained copolymers are well suited for their use as incrustation inhibitors, dispersants or ionic exchangers.

12 Claims, No Drawings

PROCEDURE FOR MANUFACTURING AND APPLICATION OF NOVEL POLYCARBOXILATE TYPES

TECHNICAL FIELD OF THE DISCOVERY

The discovery belongs to the field of chemical technology of organic compounds, more specifically to the field of synthesis and application of polycarboxylates.
Technical Problem to Be Solved Technical problem to be solved by this discovery involves copolymerization of maleic and acrylic acids or their alkaline salts in aqueous medium, whereupon maleic acid (or its alkaline salt) is used in greater molar and/or weight ratio in regard to acrylic acid and/or its alkaline salt. This fact has a positive technical and economical impact.

BACKGROUND OF THE INVENTION

Polycarboxylate type of polymers are widely used in industry and in households. In recent years, they are particularly used in so called phosphate-free detergents, where polycarboxylates, together with zeolites, efficiently substitute sodium tripolyphosphate and other phosphate species used for the same purpose. There are numerous data in the literature regarding this fact (see, e.g., J. Perner and H. W. Neumann, Tensides Surfactants and Detergents, 24,1987,6, 334–340).

Many patents can be found in this field covering the synthesis and/or application of numerous types of polycarboxylates. For example, German patent, DE-OS 22 12 623, describes a procedure for the synthesis of maleic-acrylic acid copolymer by copolymerization of maleic anhydride in benzene with acrylic acid in the presence of benzoyl peroxide as a free-radical initiator. An improved method of the synthesis of this type of copolymer is described in U.S. Pat. No. 2,887,480, whereupon the copolymerization was carried out in an aqueous medium with a free radical initiator, such as potassium peroxy bisulfate.

Further synthetic development for this type of polycarboxylates was described in German patent, DE 31 38 574, where a research group from BASF AG company worked out contemporary technical basis of the acrylic-maleic copolymer synthesis. The process is carried out in an aqueous medium, in the presence of water soluble initiator (0.5–5% related to the sum of monomers), in such a way that an aqueous solution of a dicarboxylic acid (like maleic acid) or its salt are simultaneously added a monocarboxylic monounsaturated acid (one like acrylic acid) and an initiator during 4 to 10 hours at 60°–150° C. It is interesting to note that the patent claims in this patent are formulated as follows: "a procedure of producing copolymers containing 10–60% (based on the sum of monomers) of a monoethylene unsaturated dicarboxylic acid with 4–6 C atoms, its salt with alkaline metals, or its anhydride, and 90–40% of a monoethylene unsaturated monocarboxylic acid with 3–10 C atoms or its alkaline salts". BASF AG company and its researchers, independently from this patent for the synthesis of polycarboxylates of the acrylic-maleic copolymer types, in a new patent, EP 0 025 551, protects separately the usage of these copolymers as incrustation inhibitors, i.e., as agents for binding Ca++ and Mg++ ions from hard waters, in laundry detergent formulations. In a short patent claim from this patent one says: "the use of copolymers containing, by weight, 40–90% of (Met) Acrylic acid and 60–10% of maleic acid, their alkaline or ammonium salts, respectively, as incrustation inhibitors in laundry detergents."

Among many copolymer modifications, whereupon a third monomer is often introduced to a copolymer, we mention, as examples, the following patents: EP 0 106 110, EP 0 344 591, U.S. Pat. Nos. 4,559,159, 4,647,396 and 4,659,793 (this, by no means, covers the whole relevant and/or related literature devoted to this broad field).

BRIEF DESCRIPTION OF THE INVENTION

This invention relates to the synthesis and application of maleic-acrylic acid copolymer with prevailing maleic monomeric units. More specifically, this invention enables the synthesis and application of the copolymers of maleic and acrylic acid, wherein the weight ratio of maleic residues in the copolymer is 60–100%, while the content of acrylic acid residues is 40–0%.

The above mentioned ratio of maleic to acrylic residues in the new type of copolymer has neither been described nor claimed in any patent literature so far (see, in particular, patents: DE 31 38 574 and EP 0 025 551). This is most probably due to the fact that the reaction conditions described in the mentioned patents for the synthesis of the described copolymers, can not provide the copolymers described by our invention. Namely, taking into account a decreased reactivity of maleic acid and its alkaline salts in polymerization or copolymerization processes, in respect to acrylic acid and/or its alkaline salts, it was necessary to find out the reaction conditions that enable sufficient reactivity of the maleic acid constituent thus providing its final higher content in the synthesized copolymer(s). This invention describes reaction conditions which enable the production of maleic-acrylic copolymers having the content of maleic monomer unit that is 60% or higher. These newly found reaction conditions involve high starting concentrations of maleates (60–80%), high starting pH-value of the reaction medium (9–11), as well as an elevated reaction temperature (105°–115° C.). The last parameter can be achieved at atmospheric pressure due to a high solid content of the aqueous reaction medium. In order to sufficiently increase the reactivity of the maleic acid, one needs to increase the quantity of the used initiator (hydrogen peroxide and peroxy salt) thus enabling the satisfactory kinetics of the copolymerization process.

This invention covers the intermediary range between acrylic-maleic copolymers of the BASF-type and pure homopolymers-polymaleates (the production of the last mentioned homopolymers is described in U.S. Pat. No. 4,668,735). An additional value of our invention is the fact that the use of KOH instead of NaOH during the copolymer synthesis process provides copolymers of a superior quality. Namely, the obtained copolymers show a significant increase in CCDC-values (CCDC stands for Calcium Carbonate Dispersion Capacity).

Another additional value of the invention represents the fact that Disodium Peroxy Bisulfate can be efficiently replaced (with better final results) with other commercially readily available peroxy salts, such as sodium percarbonate or sodium perborate (which are, otherwise, widely used in laundry detergent formulations worldwide. The result of this fact has been a decreased investment in starting materials, as well as a decreased time needed for a synthetic batch to be finished (from 3 to 6 hours per batch). Therefore, our invention has profound techno-economical advantages in regard to other disclosed procedures in scientific and/or patent literature.

Finally, the copolymers obtained by our method have better ecological properties in comparison to other commercial types of acrylic-maleic copolymers. (Namely, since maleates are significantly less toxic than acrylates, the permitted residues of the former are much higher than the ones of the latter).

BRIEF DESCRIPTION OF THE PREFERRED EMBODIMENTS

The reaction vessel for polycarboxylate synthesis has four necks (for a mechanical stirrer, for a condenser and for parallel and simultaneous adding of acrylic acid and an initiator). The vessel must be of an appropriate volume such that ⅔ of the vessel volume corresponds to the total volume of reaction mixture after neutralization. In the reaction vessel one prepares a concentrated alkaline solution of Na-maleate (Solution A). Solution A is refluxed and while stirring slowly, a simultaneous addition of solution B (a mixture of water, hydrogen peroxide and Na-peroxy salt of the selected concentration) and solution C (mixture of water and acrylic acid of the selected composition) is carried out. This simultaneous addition of solutions B and C lasts 3–6 hours depending on the nature of the catalyst (e.g., in the presence of Na perborate the reaction time is 3 hours, while in the case of Na-persulphate, 6 hours. During this time, reaction mixture is constantly kept at reflux temperature. Since the copolymerization reaction is exothermic, usually one does not need external heating during the process, especially when one works with larger quantities. The excess of the heat is taken out by an efficient reflux condenser. However, if one works on a smaller scale, external heating may be necessary due to certain heat losses from the reaction system. In pilot plants and industrial plants these parameters can and must be exactly determined. After all of the acrylic acid and initiator are added, one adds an excess of hydrogen peroxide for discoloration or for decreasing the intensive yellow to dark color of the concentrated alkaline solution of the freshly synthesized polycarboxylate and for transformation of possibly left unreacted maleic acid into nontoxic tartaric acid.

At the end of the reaction one usually adds water or diluted NaOH in order to adjust the final pH of the aqueous solution of polycarboxylate (7.5–8.5), as well as its final concentration at approximately 40%.

During the process, every hour, one withdraws a small aliquot of the reaction mixture (0.5 g) and after dilution with water (100 ml) and adding conc.sulphuric acid (20 ml) one titrates with 0.5N K permanganate. If the copolymerization reaction went in a satisfactory way, the final permanganate consumption should not exceed 0.5 ml. In the following examples we only give the material balance and the concentrations (quantities) of all reactants in solutions A, B, C and D. The cited wp (weight parts) and vp (volume parts) correspond proportionally to each other (g–ml, kg–lit, etc.).

EXAMPLE 1

SOLUTION A: 60 wp 485 NaOH, 20 vp water and 40 wp maleic anhydride
SOLUTION B: 10 vp water, 2.5 wp Na persulphate and 5 wp 35% hydrogen peroxide (subsequently, after finishing the addition of B and C, one adds another 5 vp 35% hydrogen peroxide for bleaching polycarboxylate solution and for ending the reaction process).
SOLUTION C: 22 vp 100% acrylic acid and 5 vp water SOLUTION D: 12 wp 48% NaOH and 30 vp water

| Consumption of K permanganate (after) | |
|---|---|
| 1. hour | 12,7 ml |
| 3. hours | 1,63 ml |
| 5 hours | 0,30 ml |

Final concentration of copolymer (determined gravimetrically): 43.2%
pH of the polycarboxylate solution: 8
Average Molecular Mass (AMM): 14300 (determined by HPLC using reference samples)
CCDC: 14 ml (given in ml of standard (0.25M) Ca(OAc)2—solution consumed for a titration (till permanent turbidity visualized against background) of 100 ml of a solution containing 2M Na2 CO3 (10 ml), at pH 10, in the presence of 1 g of copolymer (or approximately 2.5 ml of 40% aqueous copolymer solution).

EXAMPLE 2

SOLUTION A: 42 wp 48% KOH; 3.8 vp water; 20 wp maleic anhydride
SOLUTION B: 5 vp water; 1.25 wp Na persulphate; 2.5 vp 35% hydrogen peroxide (subsequently was added additional 2.5 vp of 35% hydrogen peroxide for discoloration and ending the copolymerization process).
SOLUTION C: 11 vp 100% acrylic acid; 2.5 vp water;
SOLUTION D: 4.03 wp KOH in 30 vp water.
Consumption of 0.5N KMnO4:
after 1 hour 12.0 ml
after 3 hours 1.13 ml
after 5 hours 0.40 ml
Final concentration of the copolymer solution: 37.8
pH of the copolymer solution: 8.5
Average Molecular Mass (AMM): 18125
CCDC: 17 ml

EXAMPLE 3

SOLUTION A: 100 wp 50% KOH; 40 wp maleic anhydride
SOLUTION B: 10 vp water; 2.5 wp Na—persulphate; 5 vp 35% hydrogen peroxide (subsequently was added another portion of 5 vp 35% hydrogen peroxide for discoloration and ending the copolymerization process).
SOLUTION C: 14.7 vp acrylic acid (100%); 3 vp water;
SOLUTION D: 60 vp water
Final copolymer solution concentration: 44.3%
pH of the copolymer solution: 8.7
AMM: 23000
CCDC: 21 ml

EXAMPLE 4

SOLUTION A: 57.6 WP NAOH; 62.4 VP WATER; 80 WP MALEIC ANHYDRIDE;
SOLUTION B: 13.25 vp 35% hydrogen peroxide; 10 vp water; 4 wp Na—perborate (in six portions of 0.75 wp, during the synthesis in equal time intervals; total reaction time: 3 hours); 13.25 vp hydrogen peroxide subsequently added for discoloration and ending the process.
SOLUTION C: 46.2 vp 100% acrylic acid; 28 vp water;
SOLUTION D: 10 wp NaOH; 30 vp water.
KMnO4 Consumption:
11.9 ml after the first hour 6.5 ml after the second hour
0.4 ml after the third hour
0.2 ml after neutralization.
pH at the end of the synthesis: 6
  pH after neutralization: 8.5
  Dry matter: 56%
  CCDC: 17–18 ml
  Viscosity: $5.146 \times 10^{-3}$ Pa sec The Optimal Mode for Polycarboxylate Use Depending on the final use of polycarboxylates, the reaction conditions for their synthesis have to be precisely chosen so that the synthesized copolymers have the selected and wanted properties (AMM, CCDC etc.).

Depending on the purpose of use concentrations of the applied copolymer range from several ppm to 40%.

Described polycarboxylates are mostly compatible with various aqueous solutions of other ingredients, but are, as a rule, incompatible with various organic solvents of low polarity.

I claim:

1. A process for obtaining copolymers of maleic and acrylic acids by a copolymerization of acrylic acid with maleic acid, its anhydride or its alkaline salts, in the presence of an initiator selected from a Perborate and a Percarbonate.

2. The process of claim 1 wherein the initiator is selected from Sodium Perborate and Sodium Percarbonate.

3. The process of claim 2 wherein said copolymerization is carried out in an aqueous medium in the presence of alkaline monovalent hydroxides, hydrogen peroxide and peroxy salts.

4. The process of claim 1 wherein the weight percent of maleic acid in the copolymer is greater than 65% and less than 100%, and the weight percent of acrylic acid in the copolymer is less than 35% and greater than 0%.

5. The process of claim 2 wherein the weight percent of maleic acid in the copolymer is greater than 65% and less than 100%, and the weight percent of acrylic acid in the copolymer is less than 35% and greater than 0%.

6. The process of claim 3 wherein the weight percent of maleic acid in the copolymer is greater than 65% and less than 100%, and the weight percent of acrylic acid in the copolymer is less than 35% and greater than 0%.

7. The procedure of claim 1 wherein said copolymerization is carried out with starting concentrations of alkaline maleate (60 to 90%), at the pH value between 5 and 10, at reaction temperatures of 90° to 150° C.

8. The procedure of claim 2 wherein said copolymerization is carried out with starting concentrations of alkaline maleate (60 to 90%), at the pH value between 5 and 10, at reaction temperatures of 90° to 150° C.

9. The procedure of claim 3 wherein said copolymerization is carried out with starting concentrations of alkaline maleate (60 to 90%), at the pH value between 5 and 10, at reaction temperatures of 90° to 150° C.

10. The copolymers synthesized according to claim 1 are employed as incrustation inhibitors, ionic exchangers and/or dispersants in various washing and cleaning formulations, in various closed cooling and heating systems for inhibiting scale formation, in sea water desalination, in sugar and other organic compounds refining, in drink and waste water treatments, in water- and/or oil-based pigment dispersions, in printing dyes, as well as in different pharmaceutical, cosmetic, and/or pesticidal formulations.

11. The copolymers synthesized according to claim 2 are employed as incrustation inhibitors, ionic exchangers and/or dispersants in various washing and cleaning formulations, in various closed cooling and heating systems for inhibiting scale formation, in sea water desalination, in sugar and other organic compounds refining, in drink and waste water treatments, in water- and/or oil-based pigment dispersions, in printing dyes, as well as in different pharmaceutical, cosmetic, and/or pesticidal formulations.

12. The copolymers synthesized according to claim 3 are employed as incrustation inhibitors, ionic exchangers and/or dispersants in various washing and cleaning formulations, in various closed cooling and heating systems for inhibiting scale formation, in sea water desalination, in sugar and other organic compounds refining, in drink and waste water treatments, in water- and/or oil-based pigment dispersions, in printing dyes, as well as in different pharmaceutical, cosmetic, and/or pesticidal formulations.

* * * * *

UNITED STATES PATENT AND TRADEMARK OFFICE
CERTIFICATE OF CORRECTION

PATENT NO : 5,763,553
DATED : June 9, 1998
INVENTOR(S) : Dusan A. Miljkovic and Radoslav L. Kobilarov It is certified that error appears in the above-identified patent and that said Letters Patent is hereby corrected as shown below:

On title page, item 76 Inventor

```
    replace  Dusan A. Miljkovic, 1112 Danielle Dr., Costa Mesa,
                                 Calif. 92626 with     Dusan A. Miljkovic, 1112 Danielle Dr., Costa Mesa,
                                 Calif. 92626
             Radoslav L. Kobilarov, Dositejeva 21, 2100 Novi Sad,
                                    Yugoslavia
```

Signed and Sealed this

Twenty-seventh Day of October, 1998

Attest:

BRUCE LEHMAN

*Attesting Officer*    *Commissioner of Patents and Trademarks*